United States Patent
Tolkmitt

(10) Patent No.: US 8,630,732 B2
(45) Date of Patent: Jan. 14, 2014

(54) METHOD FOR AVOIDING AN UNWANTED COLLISION BETWEEN A TOOL AND A WORKPIECE IN A MACHINE TOOL

(75) Inventor: Tom Tolkmitt, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 13/449,838

(22) Filed: Apr. 18, 2012

(65) Prior Publication Data

US 2013/0103180 A1    Apr. 25, 2013

(30) Foreign Application Priority Data

Apr. 18, 2011  (EP) ...................................... 11162780

(51) Int. Cl.
 *G06F 19/00*  (2011.01)
(52) U.S. Cl.
 USPC .......................................... 700/178; 700/255
(58) Field of Classification Search
 None
 See application file for complete search history.

(56) References Cited

U.S. PATENT DOCUMENTS

| | | | |
|---|---|---|---|
| 5,835,684 A * | 11/1998 | Bourne et al. ................. | 700/255 |
| 8,355,813 B2 * | 1/2013 | Mori et al. ..................... | 700/182 |
| 2008/0018287 A1 | 1/2008 | Ogawa | |
| 2009/0062955 A1 | 3/2009 | Ide et al. | |
| 2010/0087948 A1* | 4/2010 | Yamaguchi ................... | 700/178 |

FOREIGN PATENT DOCUMENTS

| | | |
|---|---|---|
| DE | 10114811 A1 | 10/2002 |
| EP | 2031471 A2 | 3/2009 |
| JP | 06-039677 A | 2/1994 |
| JP | 11-249722 A | 9/1999 |
| JP | 2000-35815 A | 2/2000 |
| JP | 2006-163665 A | 6/2006 |
| JP | 2007-249671 A | 9/2007 |
| JP | 2008-15740 A | 1/2008 |
| JP | 2009-54043 A | 3/2009 |
| JP | 2010-186374 A | 8/2010 |

OTHER PUBLICATIONS

Nikolaus Fecht: "Gegen den Kollisionskurs", Antriebspraxis Feb. 2007, S. 60-61; Magazine; 2007.

\* cited by examiner

*Primary Examiner* — Sean Shechtman
(74) *Attorney, Agent, or Firm* — Henry M. Feiereisen, LLC

(57) ABSTRACT

A method for avoiding an unwanted collision between a tool and a workpiece in a machine tool is disclosed, wherein when a parts program starts to run, the determination of setpoint movement values for controlling a relative movement between tool and workpiece is started based on the parts program and a determination of the material removal at the workpiece by the tool is started based on the determined setpoint movement values. It is then checked whether a tool model overlaps with a workpiece model. When an overlap is detected, the relative movement between tool and workpiece is slowed down until the relative movement stops. A related facility employing the method for controlling a machine tool is also disclosed. Unwanted collisions between a tool and a workpiece in a machine tool can thus be avoided, while attaining short machining times for the workpiece.

8 Claims, 3 Drawing Sheets

METHOD FOR AVOIDING AN UNWANTED COLLISION BETWEEN A TOOL AND A WORKPIECE IN A MACHINE TOOL

CROSS-REFERENCES TO RELATED APPLICATIONS

This application claims the priority of European Patent Application, Serial No. EP11162780, filed Apr. 18, 2011, pursuant to 35 U.S.C. 119(a)-(d), the content of which is incorporated herein by reference in its entirety as if fully set forth herein.

BACKGROUND OF THE INVENTION

The present invention relates to a method for avoiding an unwanted collision between a tool and a workpiece in a machine tool. The invention also relates to a facility for controlling a machine tool.

The following discussion of related art is provided to assist the reader in understanding the advantages of the invention, and is not to be construed as an admission that this related art is prior art to this invention.

When machining workpieces using machine tools it is important to avoid unwanted collisions between the tool and the workpiece, which may result in destruction of the tool and/or workpiece. If the running of a parts program which controls the movements of the machine tool is interrupted, particularly in the middle of the program, and the tool is moved manually away from the workpiece and then moved manually back to the original position to continue the program, unwanted collisions can frequently occur between the tool and the workpiece, since, to bring about the movement predetermined manually by the operator, the machine axes operate with so-called associated interpolation with the result that a number of machine axes are moved at the same time to move the workpiece and/or tool, so the operator often finds it difficult to estimate how a manually input predefined movement will be implemented by the machine tool. Machining on the machine tool, which often continues for a number of hours or even days, would then be to no avail, as after the collision the workpiece is no longer usable.

Conventional approaches are known wherein a collision avoidance system, with which, while a workpiece is being machined, uses a simulation to calculate a workpiece model to bring about collision avoidance. However, the calculation of a workpiece model requires a great deal of computation time, so that on the one hand a high level of computation capacity is required to implement such a collision avoidance system and on the other hand it is necessary, before the actual machining of the workpiece can be started, for the simulation to run some time before actual workpiece machining starts, since it is generally not possible to perform the determination of the workpiece model at the same time as the actual machining of the workpiece, despite the high computation capacity. In practice this means that when the operator presses the start button for machining, nothing happens initially at the machine tool, as the machine tool first has to take a certain time beforehand to calculate the current geometric workpiece form resulting during the machining of the workpiece by the tool, i.e. the workpiece model. This increases the machining time for the workpiece. Also relatively large safety gaps are required between workpiece and tool, in particular for manual operation.

It would therefore be desirable and advantageous to obviate prior art shortcomings and to provide an improved method for avoiding an unwanted collision between a tool and a workpiece in a machine tool and a facility for controlling a machine tool, which allow a short workpiece machining time.

SUMMARY OF THE INVENTION

According to one aspect of the present invention, a method for avoiding an unwanted collision between a tool and a workpiece in a machine tool includes the steps of determining setpoint movement values based on a parts program or a manual operating input, or both, controlling a relative movement between the tool and the workpiece and material removal at the workpiece by the tool based on the determined setpoint movement values, when execution of a parts program is started, and terminating or interrupting execution of the parts program to stop the relative movement. When the relative movement has stopped, a workpiece model is determined based on the determined material removal. The method further includes the steps of determining expected future setpoint movement values based on the setpoint movement values, determining a braking end arrangement of the tool based on the expected future setpoint movement values, determining a tool model based on the braking end arrangement of the tool and on a tool form model describing a geometric form of the tool, checking whether the tool model overlaps with the workpiece model, and when an overlap between the tool model and the workpiece model is detected, slowing down of the relative movement between tool and workpiece until the relative movement stops.

According to another aspect of the present invention, a facility for controlling a machine tool includes a control unit configured to receive setpoint movement values for controlling a relative movement between the tool and the workpiece based on a parts program or a manual operating input, or both, to control relative movement between the tool and the workpiece and to determine material removal at the workpiece by the tool based on the setpoint movement values. The facility further includes a material removal determination unit configured to determine material removal at the workpiece by the tool based on the determined setpoint movement values, a workpiece model determination unit configured to determine a workpiece model based on the determined material removal when, after a termination or interruption of the execution of the parts program, the relative movement has stopped, a braking end arrangement determination unit configured to determine expected future setpoint movement values based on the setpoint movement values and to determine a braking end arrangement of the tool based on the expected future setpoint movement values, a tool model determination unit configured to determine a tool model based on the braking end arrangement and on a tool form model describing a geometric form of the tool, and a check unit configured to check whether the tool model overlaps with the workpiece model and, when an overlap is detected, to slow down of the relative movement between tool and workpiece until the relative movement stops.

According to an advantageous feature of the present invention, no safety gaps are required between tool and workpiece, so the inventive method can be performed with highly filigree and in particular small workpieces.

The facility for controlling a machine tool may be present here, for example, in the form of a CNC controller, which may be implemented, for example, in form of an individual computation unit or a plurality of computation units, on which one or a plurality of computer programs with program code are executed to perform the inventive method. The computation unit or computation units may each have one or more processors, on which the computer program(s) run(s).

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
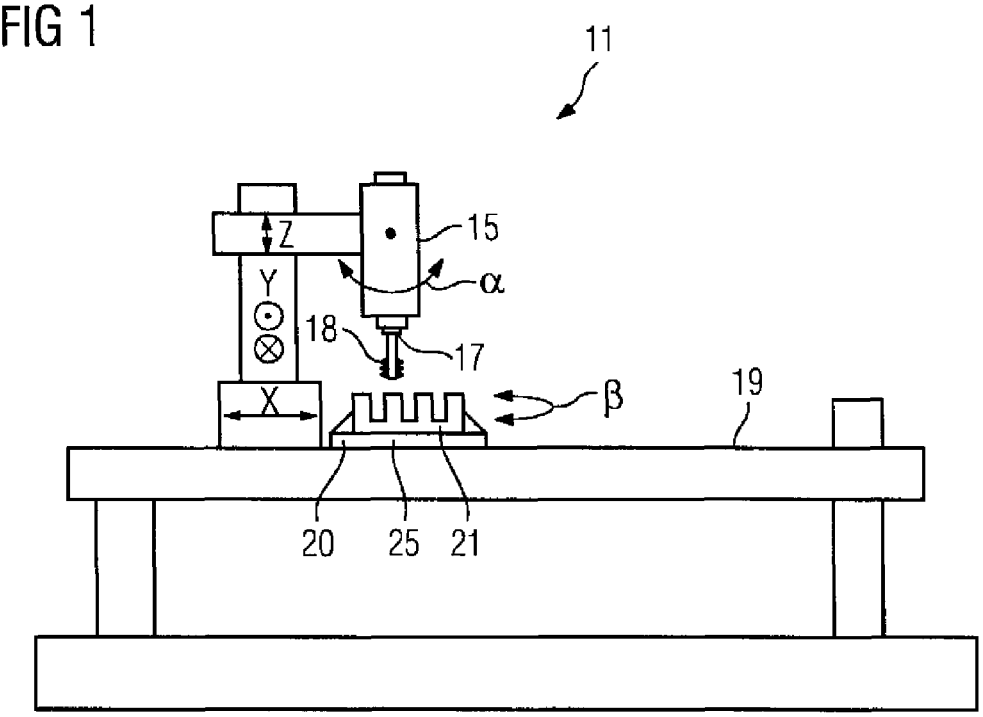
FIG. 1 shows a machine tool.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a machine tool 11 in form of a schematic diagram. The machine tool 11 in the context of the exemplary embodiment has five machine axes, by means of which a relative movement can be performed between a tool 18, which is present in the form of a mill in the context of the exemplary embodiment, and a workpiece 21. The tool 18 here is clamped in a tool holder 17, which is driven in a rotational manner by a motor 15. The motor 15 and therefore the tool 18 can move in a translational manner in the X-, Y- and Z-directions (not shown for the sake of clarity in FIG. 1) and can rotate in direction α. The workpiece 21 can also be rotated with the aid of a driven turntable 25 in direction β. The turntable 25 here is supported rotatably on a static machine stand 19.

The workpiece 21 is fastened to the turntable 25 by means of a clamping apparatus 20.

The machine tool 11 therefore has five machine axes; in other words it is what is known as a 5-axis machine tool.

It should be noted here that the inventive machine tool can of course also have more or less than five machine axes.

Figure 2:
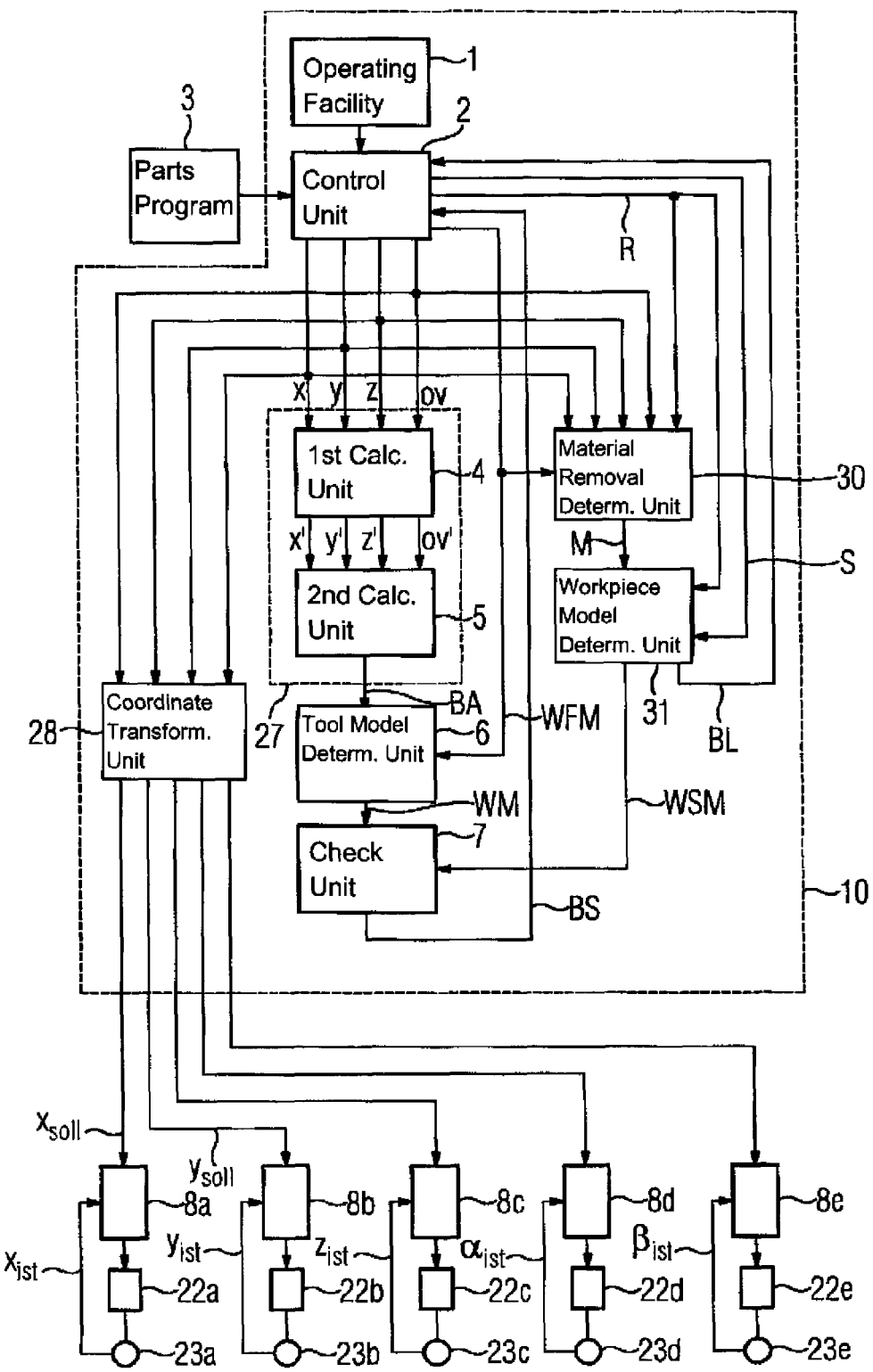
FIG. 2 shows an facility for controlling a machine tool according to the present invention.

FIG. 2 shows a block diagram of an inventive facility 10 for controlling a machine tool, i.e. in the context of the exemplary embodiment the machine tool 11, as well as the drives for moving the tool and workpiece.

The facility 10 has a control unit 2, which, based on a parts program 3 and/or a manual operating input, determines setpoint movement values x, y, z and ov for controlling a relative movement taking place between the tool 18 and the workpiece 21. The control unit 2 determines the setpoint movement values based on the parts program 3, in which the movement to be performed by the tool in relation to the workpiece is defined in the form of commands. The movement of the tool and/or workpiece can also be predefined by means of a manual operating input, which is input by way of an operating facility 1, by an operator in situ at the machine tool. The operating facility 1 can be a hand wheel and/or a keyboard for example.

Figure 3:
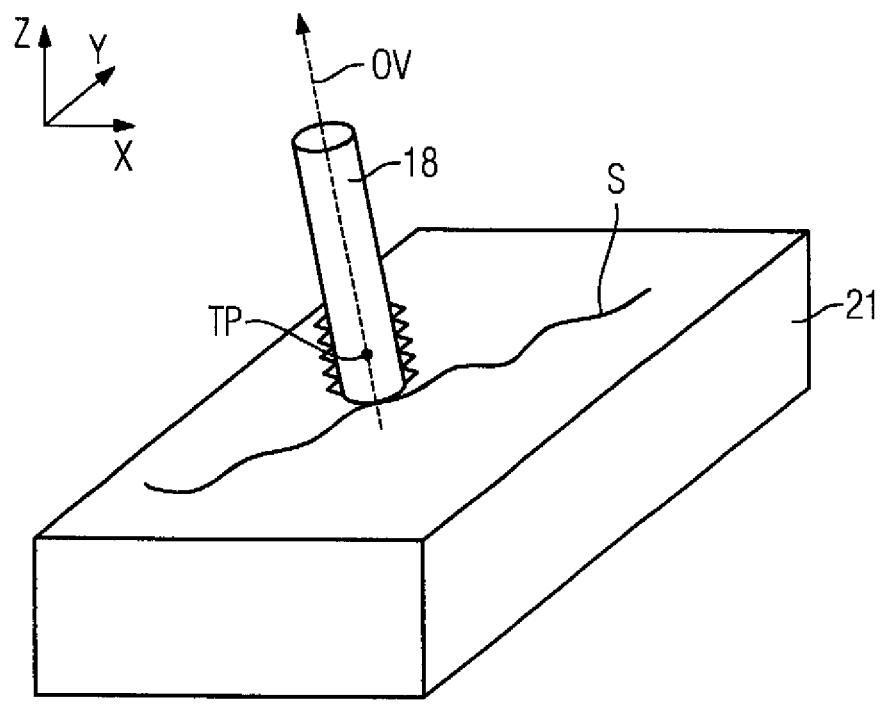
FIG. 3 shows a movement path S, along which a mill is moved to machine a workpiece.

The parts program 3 is generally generated by a CAM/CAD system and what is known as a post processor, which may be connected downstream of the CAM/CAD system. The movement of the tool 18 in relation to a static workpiece 21 is defined (see FIG. 3) in the parts program. The tool 18 is moved along a movement path S. The setpoint movement values, which are determined by the control unit 2, are present in the context of the exemplary embodiment in the form of setpoint position values x, y and z, which describe the movement of the so-called tool center point TP of the tool 18 in the X-, Y- and Z-directions, i.e. in 3-dimensional space. The tool center point TP here is a point that is preferably defined on the rotation axis of the tool 18. Orientation vector values ov are also determined by the control unit 2 as setpoint movement values, specifying the orientation of the orientation vector OV of the tool and therefore the alignment of the tool in 3-dimensional space, when the tool 18 is moved on the movement path S.

The position and orientation of the tool in relation to the workpiece on the movement path S for every point of the movement path S are defined by the setpoint movement values.

The determination of the setpoint movement values for controlling the relative movement taking place between tool and workpiece takes place based on the parts program when the parts program starts to run. Parallel to this the determination of the material removal M at the workpiece is started based on the determined setpoint movement values. To determine the material removal M the setpoint movement values x, y, z and ov are transmitted immediately after their determination in the interpolation cycle (e.g. every 4 ms) to a material removal determination unit 30, which calculates the material removal M at the workpiece resulting due to the machining of the workpiece by the tool based on the setpoint movement values. To determine the material removal M, workpiece unmachined part data R, which describes the geometric form of the unmachined part (geometric form of the workpiece before machining by the tool) of the workpiece and is stored in a memory of the facility 10, is transmitted by the control unit 2 to the material removal determination unit 30. A tool form model WFM describing the geometric form of the tool, which is stored in a memory of the facility 10, is also transmitted by the control unit 2 to the material removal determination unit 30. The material removal determination unit 30 then determines the material removal M resulting due to the machining of the tool at the workpiece based on the tool form model WFM, the setpoint movement values and the workpiece unmachined part data R.

In the context of the exemplary embodiment the determination of the material removal M preferably takes place in real time with the determination of the setpoint movement values. The control unit 2 generally generates the setpoint movement values preferably in a fixed time cycle, the so-called interpolation cycle. If setpoint movement values are generated for example in the context of the exemplary embodiment every four milliseconds by the control unit 2, the material removal M is then preferably recalculated and updated correspondingly every four milliseconds. Of course the determination of the material removal M can however also not take place in real time.

If, after a termination, i.e. after a complete run of the parts program, or interruption of the running of the parts program 3, the relative movement between workpiece and tool has stopped, the workpiece model determination unit 31 uses the determined material removal M and the workpiece unmachined part data R to determine a workpiece model WSM describing the geometric form of the workpiece. The workpiece unmachined part data R is transmitted by the control unit 2 to the workpiece model determination unit 31. An interruption of the running of the parts program can be initiated for example by the operator, e.g. by switching from automatic mode to manual mode. To determine the workpiece model WSM, in the context of the exemplary embodiment the workpiece model determination unit 31 calculates a grid, which connects points adjacent to one another on the surface of the workpiece, so that in the context of the exemplary embodiment the workpiece model WSM is present in the form of a so-called volume model, formed by the grid. Determination of the workpiece model WSM based on the material removal M and the workpiece unmachined part data R involves major computation outlay, so it cannot be performed in real time, i.e. parallel in time to the machining actually taking place on the machine.

If, after a termination or interruption of the running of the parts program 3, the relative movement between workpiece and tool has stopped, the control unit 2 transmits a start signal S to the workpiece model determination unit 31. As soon as the workpiece model determination unit 31 receives the start signal S, it determines the workpiece model WSM from the material removal M, which then does not change. While the determination of the workpiece model WSM by the workpiece model determination unit 31 is taking place, the workpiece model determination unit 31 sends a blocking signal BL for manual operating input to the control unit 2, until the workpiece model calculation is completed. While the blocking signal BL is present, manual operating inputs input by an operator of the machine tool at the operating facility 1 for controlling a relative movement between tool and workpiece are blocked. Since the workpiece model determination unit 31 already has the material removal M available as an input variable and the workpiece model determination unit 31 can use the material removal M to calculate the workpiece model WSM relatively quickly, the blocking of the manual operating input only lasts a short time. The operator can then, i.e. after completion of the determination of the workpiece model WSM, predefine a relative movement between tool and workpiece by means of a manual operating input at the operating facility 1, in order for example to move the tool out of the workpiece by means of the machine axes. The control unit 2 uses the manual operating input to determine the setpoint movement values x, y, z and ov in the same way as before when controlled by the parts program. The workpiece model WSM is transmitted to a check unit 7.

The setpoint movement values are also supplied by the control unit 2 to a braking end arrangement determination unit 27 and within this to a first calculation unit 4 as input variables. The first calculation unit 4 of the braking end arrangement determination unit 27 uses the current setpoint movement values x, y, z and ov to determine expected future setpoint movement values x', y', z' and ov' in each instance. The future movement values are determined here in the context of the exemplary embodiment by extrapolation from the setpoint movement values currently generated by the control unit 2 and from setpoint movement values further in the past. It is thus possible to use the current setpoint movement values and setpoint movement values from the past to calculate the speed of the tool in every direction and to use this speed to determine an expected future position of the tool. Similarly the orientation of the orientation vector of the tool can also be extrapolated into the future. In this process the setpoint movement values are preferably only calculated in advance around a so-called interpolation cycle of the control unit, i.e. generally only around a few milliseconds into the future. The expected future setpoint movement values therefore correspond very closely to the actual future setpoint movement values, which are generated in the next interpolation cycle by the control unit 2. Of course the expected future setpoint movement values can however also lie further in the future than just a few milliseconds.

The expected future setpoint movement values x', y', z' and ov' are then transmitted to a second calculation unit 5 of the braking end arrangement determination unit 27. The second calculation unit 5 uses the expected future setpoint movement values x', y', z' and ov' to determine a braking end arrangement BA of the tool 18. The braking end arrangement BA here indicates the position and orientation of the tool when the relative movement between tool and workpiece stops, if braking of the relative movement between tool and workpiece were performed based on the expected future setpoint movement values until the relative movement stopped. The braking end arrangement BA is then transmitted to a tool model determination unit 6, which uses the braking end arrangement BA and a tool form model WMF describing the geometric form of the tool to determine a tool model WM. In the context of the exemplary embodiment the tool model WM therefore describes the geometric form of the tool, the position of the tool and the orientation of the tool.

To this end the control unit 2 transmits the tool form model WFM of the tool to the tool model determination unit 6. The tool form model here is stored in a memory of the facility 10. The tool model WM is then transmitted to a check unit 7, in which it is checked whether the tool model WM overlaps with the workpiece model WSM.

If the check unit 7 detects that the tool model WM overlaps with the workpiece model WSM, the check unit 7 brings about a slowing down of the relative movement between tool and workpiece until the relative movement stops. To this end, if tool model and workpiece model overlap, the check unit 7 generates a braking signal BS and transmits this to the control unit 2, which correspondingly generates setpoint movement values to bring about a slowing down of the relative movement until the relative movement stops.

Parallel in time to the transmission of the setpoint movement values from the control unit 2 to the braking end arrangement determination unit 27, the setpoint movement values are transmitted to a coordinate transformation unit 28, which, according to the kinematic of the machine tool, i.e. the machine axes of the machine tool actually available to move the tool and/or workpiece, generates set point position values $x_{setpoint}$, $y_{setpoint}$, $z_{setpoint}$, $\alpha_{setpoint}$ and $\beta_{setpoint}$ as setpoint control values for controlling the movement of the drives to move the machine axes. Depending on how the kinematic of the machine tool is configured, the workpiece and/or tool is moved to bring about the relative movement between workpiece and tool. Thus for example, if the machine tool has a kinematic, with which only the workpiece can be moved, the workpiece is moved to bring about the relative movement between workpiece and tool, while the tool remains static.

The setpoint position values for controlling the drives are transmitted to the respective associated regulators 8a, 8b, 8c, 8d and 8e, which activate correspondingly assigned power converters 22a, 22b, 22c, 22d and 22e. The power converters supply respectively assigned electric motors 23a, 23b, 23c, 23d and 23e, which each drive a machine axis. In this process, position sensors (not shown in FIG. 2 for the sake of clarity) transmit actual position values $x_{actual}$, $y_{actual}$, $z_{actual}$, $\alpha_{actual}$ and $\beta_{actual}$ as actual control values for regulating the drives to the regulators 8a, 8b, 8c, 8d and 8e.

The inventive method for avoiding an unwanted collision therefore operates parallel to the actual movement of the tool and/or workpiece performed on the machine. A time period after the parts program starts to run is therefore no longer required, to calculate a simulation in advance for a certain time period, before the actual machining of the workpiece can be started. The machining time for machining the workpiece is thus reduced by the invention.

Since the method preferably determines expected setpoint movement values that only lie a relatively short time into the future, it operates with great accuracy, so no safety gaps are required between workpiece and tool and the method can therefore also be used to manufacture very small and in particular filigree workpieces.

It should be noted here that in the context of the exemplary embodiment the control unit 2, the braking arrangement determination unit 27, the tool model determination unit 6, the check unit 7, the material removal determination unit 30, the workpiece model determination unit 31 and the coordinate transformation unit 28 are present in the form of program code segments, which are executed on one or a number of processors.

The individual units here can run on a single computation unit, which can have an individual or a number of processors or even on a number of separate computation units. Thus for example the control unit 2, the braking arrangement determination unit 27, the tool model determination unit 6, the check unit 7 and the coordinate transformation unit 28 can run on a first computation unit and the material removal determination unit 30 and the workpiece model determination unit 31 can run on a second computation unit, for example a personal computer. Of course, however, all the units may also run on a single computation unit.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for avoiding an unwanted collision between a tool and a workpiece in a machine tool, comprising the steps of:
    determining setpoint movement values based on a parts program,
    controlling a relative movement between the tool and the workpiece and determining material removal at the workpiece by the tool based on the determined setpoint movement values, when execution of the parts program is started,
    terminating or interrupting execution of the parts program to stop the relative movement,
    when the relative movement has stopped, determining a workpiece model based on the determined material removal,
    defining actual setpoint movement values based on a manual operating input,
    determining expected future setpoint movement values based on the actual setpoint movement values,
    determining a braking end arrangement of the tool based on the expected future setpoint movement values,
    determining a tool model based on the braking end arrangement of the tool and on a tool form model describing a geometric form of the tool,
    checking whether the tool model overlaps with the workpiece model, and
    when an overlap between the tool model and the workpiece model is detected, slowing down of the relative movement between tool and workpiece until the relative movement stops.

2. The method of claim 1, wherein the expected future setpoint movement values are determined by extrapolation from the actual setpoint movement values and from past setpoint movement values.

3. A computer program having program code stored on a non-transitory computer-readable medium, said computer program, when executed by at least one computation unit, causing the computing unit to carry out a method for avoiding an unwanted collision between a tool and a workpiece in a machine tool, the method comprising the steps of:
    determining setpoint movement values based on a parts program,
    controlling a relative movement between the tool and the workpiece and determining material removal at the workpiece by the tool based on the determined setpoint movement values, when execution of the parts program is started,
    terminating or interrupting execution of the parts program to stop the relative movement,
    when the relative movement has stopped, determining a workpiece model based on the determined material removal,
    defining actual setpoint movement values based on a manual operating input,
    determining expected future setpoint movement values based on the actual setpoint movement values,
    determining a braking end arrangement of the tool based on the expected future setpoint movement values,
    determining a tool model based on the braking end arrangement of the tool and on a tool form model describing a geometric form of the tool,
    checking whether the tool model overlaps with the workpiece model, and
    when an overlap between the tool model and the workpiece model is detected, slowing down of the relative movement between tool and workpiece until the relative movement stops.

4. The method of claim 3, wherein the expected future setpoint movement values are determined by extrapolation from the actual setpoint movement values and from past setpoint movement values.

5. A facility for controlling a machine tool, comprising:
    a control unit configured to determine setpoint movement values for controlling a relative movement between the tool and a workpiece based on a parts program, to control the relative movement between the tool and the workpiece and to determine material removal at the workpiece by the tool based on the setpoint movement values,
    a material removal determination unit configured to determine material removal at the workpiece by the tool based on the determined setpoint movement values,
    a workpiece model determination unit configured to determine a workpiece model based on the determined material removal when, after a termination or interruption of the execution of the parts program, the relative movement has stopped, a braking end arrangement determination unit configured to determine expected future setpoint movement values based on actual setpoint movement values provided by a manual operating input and to determine a braking end arrangement of the tool based on the expected future setpoint movement values, a tool model determination unit configured to determine a tool model based on the braking end arrangement and on a tool form model describing a geometric form of the tool, and a check unit configured to check whether the tool model overlaps with the workpiece model and, when an overlap is detected, to slow down of the relative movement between tool and workpiece until the relative movement stops.

6. The method of claim 5, wherein the expected future setpoint movement values are determined by extrapolation from the actual setpoint movement values and from past setpoint movement values.

7. A machine tool with a facility for controlling the machine tool, the facility comprising:

a control unit configured to determine setpoint movement values for controlling a relative movement between the tool and a workpiece based on a parts program, controlling the relative movement between the tool and the workpiece and determining material removal at the workpiece by the tool based on the setpoint movement values, a material removal determination unit configured to determine material removal at the workpiece by the tool based on the determined setpoint movement values, a workpiece model determination unit configured to determine a workpiece model based on the determined material removal when, after a termination or interruption of the execution of the parts program, the relative movement has stopped, a braking end arrangement determination unit configured to determine expected future setpoint movement values based on actual setpoint movement values provided by a manual operating input and to determine a braking end arrangement of the tool based on the expected future setpoint movement values, a tool model determination unit configured to determine a tool model based on the braking end arrangement and on a tool form model describing a geometric form of the tool, and a check unit configured to check whether the tool model overlaps with the workpiece model and, when an overlap is detected, to slow down of the relative movement between tool and workpiece until the relative movement stops.

8. The method of claim 7, wherein the expected future setpoint movement values are determined by extrapolation from the actual setpoint movement values and from past setpoint movement values.

* * * * *